US009838268B1

(12) United States Patent
Mattson

(10) Patent No.: US 9,838,268 B1
(45) Date of Patent: Dec. 5, 2017

(54) DISTRIBUTED, ADAPTIVE CONTROLLER FOR MULTI-DOMAIN NETWORKS

(71) Applicant: Juniper Networks, Inc., Sunnyvale, CA (US)

(72) Inventor: Geoffrey A. Mattson, Palo Alto, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 498 days.

(21) Appl. No.: 14/318,534

(22) Filed: Jun. 27, 2014

(51) Int. Cl.
*H04L 12/24* (2006.01)
*H04L 12/911* (2013.01)
*H04L 12/751* (2013.01)
*H04L 12/803* (2013.01)
*H04L 29/08* (2006.01)
*H04L 12/801* (2013.01)
*H04L 12/851* (2013.01)
*H04L 12/759* (2013.01)

(52) U.S. Cl.
CPC .......... *H04L 41/32* (2013.01); *H04L 41/20* (2013.01); *H04L 45/02* (2013.01); *H04L 45/028* (2013.01); *H04L 47/122* (2013.01); *H04L 47/193* (2013.01); *H04L 47/2441* (2013.01); *H04L 47/70* (2013.01); *H04L 67/02* (2013.01)

(58) Field of Classification Search
CPC combination set(s) only.
See application file for complete search history.

(56) References Cited

U.S. PATENT DOCUMENTS

| 2004/0179528 | A1* | 9/2004 | Powers | G06Q 10/10 370/392 |
| 2011/0129222 | A1* | 6/2011 | Karol | H04J 14/0257 398/58 |
| 2012/0308225 | A1* | 12/2012 | Long | H04L 45/04 398/13 |
| 2013/0250770 | A1* | 9/2013 | Zou | H04L 47/19 370/238 |

(Continued)

FOREIGN PATENT DOCUMENTS

WO    2013/184846 A1    12/2013

OTHER PUBLICATIONS

OpenFlow Switch Specification-Version "1.4.0" (Oct. 14, 2013).*

(Continued)

*Primary Examiner* — Chris Parry
*Assistant Examiner* — Caroline Jahnige
(74) *Attorney, Agent, or Firm* — Shumaker & Sieffert, P.A.

(57) ABSTRACT

In some examples, a control network for one or more network segments of a network comprises a plurality of controllers each including one or more processors. The plurality of controllers receive service requests that each comprises a definition for a service provided by the network to connect at least two endpoints over a path traversing at least one of the one or more network segments, wherein the control network operates according to a control model by which the plurality of controllers provision services in the one or more network segments to satisfy the service requests. The plurality of controllers dynamically adapt, based on network conditions including the service requests, the control model for the control network. The plurality of controllers provision, according to the adapted control model, services for the service requests.

19 Claims, 6 Drawing Sheets

(56) References Cited

U.S. PATENT DOCUMENTS

| | | | |
|---|---|---|---|
| 2015/0163151 A1* | 6/2015 | Li | H04L 47/2441 370/236 |
| 2015/0271078 A1* | 9/2015 | Rath | H04L 47/193 370/235 |
| 2015/0295761 A1* | 10/2015 | Wang | H04L 41/0806 709/222 |
| 2015/0365314 A1* | 12/2015 | Hiscock | H04L 41/12 370/389 |

OTHER PUBLICATIONS

Atlas et al., "Interface to the Routing System Framework," draft-ward-irs-framework-00, Network Working Group, Jul. 30, 2012, 15 pages.

Vasseur, "Path Computation Element (PCE) Communication Protocol (PCEP)," Network Working Group, RFC 5440, Mar. 2009, 61 pgs.

Hunt, "Software Defined Networking: An Imperative for the Service Provider Network," Advisory Report, Current Analysis, Inc., May 31, 2013, 16 pgs.

"Building Multi-Generation Scalable Networks With End-To-End MPLS," Juniper Enables Service Flexibility and Scalability with Seamless MPLS, White Paper, Juniper Networks, Inc., 2012, 11 pgs (retrieved Jun. 26, 2014).

* cited by examiner

DISTRIBUTED, ADAPTIVE CONTROLLER FOR MULTI-DOMAIN NETWORKS

TECHNICAL FIELD

The invention relates to computer networks and, more specifically, to controlling computer networks.

BACKGROUND

Service providers and large enterprises face pressure to responsively and rapidly deploy requested services while reducing overall capital expenditures (CapEx) and operational expenditures (OpEx). Network managers are seeking to move to an operational model where capacity upgrades are targeted, service-driven, and can adapt dynamically to ever-changing needs of their customers in near real-time, all while leveraging existing investments in network infrastructure. Current service provisioning models provide limited flexibility, as they are typically tightly coupled with the topological placement of the network devices and further, require significant operational expenditure for managing multiple different technologies for deployment, troubleshooting, and fault recovery.

SUMMARY

In general, a distributed and adaptive controller for controlling heterogeneous networks is described. The distributed controller encompasses networks of controllers that cooperate to facilitate a common control plane for multiple network segments, each of which may include various network layers and network types such as mobile/wireless, optical, and routing. Upon deployment at various points in a multi-segment network, the controllers discover the services request profile of the network as well as the available resources. In view of the available network resources and according to the services request profile, which may account for intra- and inter-segment service requests among the various controller domains, the controllers automatically self-scale and intelligently distribute the control plane computational workload and per-controller span of control within a hierarchical arrangement of the controllers.

For example, individual control planes that are members of the distributed control network hierarchy may control any one or more segments of the network each operating according to a particular control model (e.g., fully distributed or centralized), where "control" refers herein at least to receiving services requests and allocating network resources to fulfill the services requests. Control planes may form control plane networks (or more simply, "control networks") to cooperatively fulfill services requests that traverse multiple segments controlled by respective control planes. Each of the control planes may, depending on the control model, be implemented by one or more controllers (as in the centralized model), by a network of autonomous or semi-autonomous network elements (as in the fully distributed model), or by some combination thereof.

As described herein, control planes organized as a hierarchical control network for the network may transition among control models so as to improve the performance of the control network with respect to fulfilling services requests. Such transitions may include adapting the span of control for controllers within the hierarchy by subsuming or releasing a control plane under the control of a higher-level controller, increasing control network resources by standing up additional computational resources, and redistributing the distributed computation among control planes of the control network. The control network determines whether to modify the control network configuration based the services request profile according to network manager preferences as expressed, e.g., by policies embodied in a state machine having state transitions conditioned on characteristics of the services request profile, such as number of multi-segment requests, number of single-segment requests, network resource utilization, and so forth. By analyzing the services request profile to intelligently and cooperatively adapt the control network to network conditions, the controllers of the control network may in this way facilitate high-performance services request fulfillment and near-optimal routing of services traffic among the controller domains.

In one example, a method comprises receiving, by a plurality of controllers that constitute a control network for one or more network segments of a network, service requests that each comprises a definition for a service provided by the network to connect at least two endpoints over a path traversing at least one of the one or more network segments, wherein the control network operates according to a control model by which the plurality of controllers provision services in the one or more network segments to satisfy the service requests. The method also comprises dynamically adapting, by the plurality of controllers and based on network conditions including the service requests, the control model for the control network. The method also comprises provisioning, by the plurality of controllers operating according to the adapted control model, services for the service requests.

In another example, a control network for one or more network segments of a network, the control network comprising a plurality of controllers each including one or more processors. The plurality of controllers receive service requests that each comprises a definition for a service provided by the network to connect at least two endpoints over a path traversing at least one of the one or more network segments, wherein the control network operates according to a control model by which the plurality of controllers provision services in the one or more network segments to satisfy the service requests. The plurality of controllers dynamically adapt, based on network conditions including the service requests, the control model for the control network. The plurality of controllers provision, according to the adapted control model, services for the service requests.

In another example, a non-transitory computer-readable medium contains instructions. The instructions cause a programmable processor to receive, by a plurality of controllers that constitute a control network for one or more network segments of a network, service requests that each comprises a definition for a service provided by the network to connect at least two endpoints over a path traversing at least one of the one or more network segments, wherein the control network operates according to a control model by which the plurality of controllers provision services in the one or more network segments to satisfy the service requests; dynamically adapt, by the plurality of controllers and based on network conditions including the service requests, the control model for the control network; and provision, by the plurality of controllers operating according to the adapted control model, services for the service requests.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
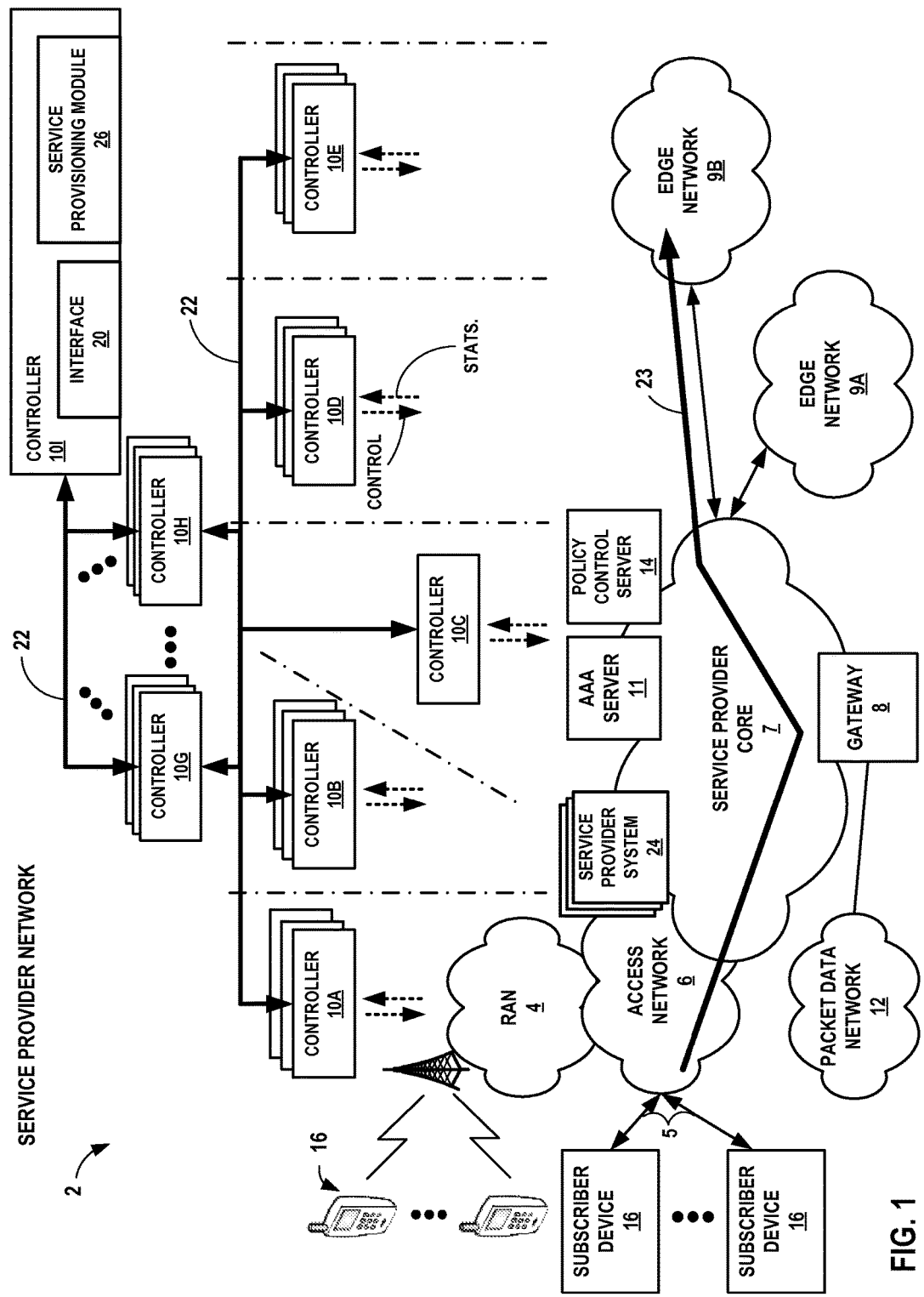
FIG. 1 illustrates an example network system in accordance with techniques described herein.

FIG. 1 illustrates an example network system in accordance with techniques described herein. The example network system of FIG. 1 includes a service provider network 2 that provides packet-based network services to subscriber devices 16A-16N (collectively, "subscriber devices 16"). That is, service provider network 2 provides authentication and establishment of network access for subscriber devices 16 such that the subscriber device may begin exchanging data packets with PDN 12, which may represent an internal or external packet-based network such as the Internet. Although described with respect to a service provider operating a service provider network 2, network 2 may in some examples represent an enterprise network managed by a large enterprise. In addition, although described with respect to "subscribers" that connote end-users of a service provider network services, the techniques described herein are similarly applicable to "customers" of the service provider and to customer devices such as cell towers, multi-tenant units (MTUs), residential aggregation points, and so forth. Examples of customers may include universities, businesses, or any other entities that purchase, lease, or otherwise use services provided by service provider network 2.

In the example of FIG. 1, service provider network 2 includes access network 6 ("access network 6") that provides connectivity to packet data network (PDN) 12 and edge networks 9 via service provider core network 7 and gateway 8. Service provider core network 7 and PDN 12 provide packet-based services that are available for request and use by subscriber devices 16. As examples, core network 7 and/or PDN 12 may provide, for example, bulk data delivery, voice over Internet protocol (VoIP), Internet Protocol television (IPTV), Short Messaging Service (SMS), Wireless Application Protocol (WAP) service, or customer-specific application services. Packet data network 12 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates access network 6, an enterprise IP network, or some combination thereof. In various embodiments, PDN 12 is connected to a public WAN, the Internet, or to other networks. Packet data network 12 executes one or more packet data protocols (PDPs), such as IP (IPv4 and/or IPv6), X.25 or Point-to-Point Protocol (PPP), to enable packet-based transport of PDN 12 services.

Subscriber devices 16 connect to gateway 8 via access network 6 to receive connectivity to subscriber services for applications hosted by subscriber devices 16. A subscriber may represent, for instance, an enterprise, a residential subscriber, or a mobile subscriber. Subscriber devices 16 may be, for example, personal computers, laptop computers or other types of computing device associated with subscribers. In addition, subscriber devices 16 may comprise mobile devices that access the data services of service provider network 2 via radio access network (RAN) 4. Example mobile subscriber devices include mobile telephones, laptop or desktop computers having, e.g., a 3G wireless card, wireless-capable netbooks, video game devices, pagers, smart phones, personal data assistants (PDAs) or the like. Each of subscriber devices 16 may run a variety of software applications, such as word processing and other office support software, web browsing software, software to support voice calls, video games, videoconferencing, and email, among others. Subscriber devices 16 connect to access network 6 via access links that comprise wired and/or wireless communication links. The term "communication link," as used herein, comprises any form of transport medium, wired or wireless, and can include intermediate nodes such as network devices. Each of access links may comprise, for instance, aspects of an asymmetric DSL network, WiMAX, a T-1 line, an Integrated Service Digital Network (ISDN), wired Ethernet, or a cellular radio link.

A network service provider operates, or in some cases leases, elements of access network 6 to provide packet transport between subscriber devices 16 and gateway 8. Access network 6 represents a network that aggregates data traffic from one or more subscribers for transport to/from service provider core network 7 of the service provider. Access network 6 may include multiple "access" segment coupled to an aggregation segment and/or backhaul network owned or leased by the service provider. An access node of an access network couples to the customer premises equipment (CPE) to process subscriber packets at layer 2 (L2) or higher. Access nodes may include digital subscriber line access multiplexors (DSLAMs), multi-tenant units (MTUs), passive optical network (PON) optical line termination devices, cell site gateways (CSGs), eNode Bs, and so forth.

Access network 6 includes network nodes that execute communication protocols to transport control and user data to facilitate communication between subscriber devices 16 and gateway 8. Access network 6 may include a broadband access network, network, a wireless LAN, a public switched telephone network (PSTN), or other type of access network, and may include or otherwise provide connectivity for cellular access networks, such as radio access network (RAN) 4 of FIG. 1. Examples of access network 6 may also include networks conforming to a Universal Mobile Telecommunications System (UMTS) architecture, an evolution of UMTS referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GGP/2) and the Worldwide Interoperability for Microwave Access (WiMAX) forum.

Transport nodes of the access network connect access nodes to border nodes that enable inter-region packet transport. Border nodes may include area border routers and autonomous system boundary routers (ASBRs). In the illustrated example, border nodes (not shown) couple access network 6 to core network 7.

Service provider core network 7 (hereinafter, "core network 7") offers packet-based connectivity to subscriber devices 16 attached to access network 6 for accessing PDN 12. Core network 7 may represent a public network that is owned and operated by a service provider to interconnect a plurality of networks, which may include access network 6. Core network 7 may implement Multi-Protocol Label Switching (MPLS) forwarding and in such instances may be referred to as an MPLS network or MPLS backbone. In some instances, core network 7 represents a plurality of interconnected autonomous systems, such as the Internet, that offers services from one or more service providers. PDN 12 may represent an edge network coupled to core network 7, e.g., by a customer edge device such as customer edge switch or router. PDN 12 may include a data center.

Access network 6, core network 7, and edge networks 9 may include service nodes that apply services to subscriber packets. Service node examples include L2 provider edge (PE) or L3 PE routers, broadband network gateway (BNGs), peering routers, content servers, media gateways, base station controllers, and so forth. Illustrated gateway 8 includes an example of a service node.

In examples of network 2 that include a wireline/broadband access network, gateway 8 may represent a Broadband Network Gateway (BNG), a Broadband Remote Access Server (BRAS), MPLS Provider Edge (PE) router, core router, L2/L3 PE router, or gateway, for instance. In examples of network 2 that include a cellular access network as access network 6, gateway 8 may represent a mobile gateway, for example, a Gateway General Packet Radio Service (GPRS) Serving Node (GGSN), an Access Gateway (aGW), or a Packet Data Network (PDN) Gateway (PGW). In other examples, the functionality described with respect to gateway 8 may be implemented in a switch, service card or other network element or component.

Network 2 additionally includes, in this example, edge networks 9A-9B (collectively, "edge networks 9." In some examples, edge networks 9 may represent, e.g., business edge networks, broadband subscriber management edge networks, mobile edge networks, customer sites such as enterprise branch offices, or a combination thereof. In some examples, any of edge networks 9 may offer service provider managed network-hosted Value Added Services (VAS) including application-aware, and subscriber-aware services and charging, for instance. Access network 6 of FIG. 1 is also an example of an edge network for service provider network 2. Any of edge networks 9 may alternatively represent a data center/value-added services complex that offers services by a computing environment comprising, e.g., a scalable cluster of general computing devices, such as x86 processor-based servers. As another example, the computing environment may comprise a combination of general purpose computing devices and special purpose appliances.

As virtualized, individual network services provided by service nodes of the data center can scale through the allocation of virtualized memory, processor utilization, storage and network policies, as well as by adding additional load-balanced virtual machines. In one example, edge network 9A includes a data center that comprises a set of interconnected, high-performance yet off-the-shelf packet-based routers and switches that implement industry standard protocols. In one example, edge network 9A includes a data center that comprises off-the-shelf components that provide Internet Protocol (IP) over an Ethernet (IPoE) point-to-point connectivity.

A network service provider that administers at least parts of network 2 typically offers services to subscribers associated with devices, e.g., subscriber devices 16, which access the service provider network. Services offered may include, for example, traditional Internet access, Voice-over-Internet Protocol (VoIP), video and multimedia services, security services, and linking customer sites through the core network 7 using one of a point-to-point Ethernet service, multipoint-to-multipoint Ethernet service, point-to-multipoint Ethernet service, full-mesh L3VPN, and hub-and-spoke L3VPN, for instance. As described above with respect to access network 6, core network 7 may support multiple types of access network infrastructures that connect to service provider network access gateways to provide access to the offered services.

In general, any one or more of subscriber devices 16 may request authorization and data services by sending a session request to gateway 8. In turn, gateway 8 typically accesses Authentication, Authorization and Accounting (AAA) server 11 to authenticate the subscriber device requesting network access. Once authenticated, any of subscriber devices 16 may send subscriber data traffic toward service provider core network 7 in order to access and receive services provided by PDN 12 or edge networks 9, and such packets may traverse service provider core 7 as part of at least one packet flow. The term "packet flow," "traffic flow," or simply "flow" refers to a set of packets originating from a particular source device and sent to a particular destination device. A single flow of packets, in either the upstream (sourced by one of subscriber devices 16) or downstream (destined for one of subscriber devices 16) direction, may be identified by the 5-tuple: <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet. Moreover, a subscriber device may originate multiple packet flows upon authenticating to service provider network 2 and establishing a communication session for receiving data services.

A network manager employs a network of controllers 10A-10H (collectively, "controllers 10") to provision services within service provider network 2 to provide access for subscriber devices 16 to requested services. Controllers 10 each provide provides a high-level controller for configuring and managing various and respective domains of service provider network 2 (e.g., core network 7, access network 6, and edge networks 9). In some instances, any of controllers 10 may manage deployment of virtual machines within the operating environment of a value-added services complex. Controllers 10C may interact with gateway 8 to specify service chains. For example, the service chain information provided by controller 10C may specify any combination and ordering of value-added services, traffic engineering information (e.g., labels or next hops) for tunneling or otherwise transporting (e.g., MPLS or IP tunnels) packet flows along service paths, rate limits, Type Of Service (TOS) markings or packet classifiers that specify criteria for matching packet flows to a particular service chain. Further example details of an SDN controller for a software-defined network are described in PCT International Patent Application PCT/US13/44378, filed Jun. 5, 2013, the entire contents of which are incorporated herein by reference.

Service provider network 2 may include an Authentication, Authorization and Accounting server 11 ("AAA server 11"). Upon detecting a new traffic flow, gateway 8 may authenticate new subscribers to AAA server 11, e.g., by way of the RADIUS or Diameter protocols, and, at this time, receive a service request or other information that defines the services to be applied to the subscriber or maps the various traffic expected for the subscriber to one or more service flows. Upon detecting a new flow, the gateway 8 may select a service chain for the flow based on the service profile and traffic type. For example, gateway 8 selects one of the service chains for the packet based on the service profile received for the subscriber and/or based on the type of traffic, e.g., HTTP traffic or VoIP traffic.

Service provider network 2 may include a service provider system 24. In general, service provider system 24 may send requests to any of controllers 10 that cause the controller to validate, provision, and/or manage services provided by service provider network 2. Service provider system 24 may send data-interchange formatted messages to interface 20 of controllers 10 that include requests to validate, provision, and/or manage services provided by service provider network 2. Although only central controller 10I is illustrated as including interface 20 and service provisioning module 26, each of controllers 10 may include a similar interface 20 and service provisioning module 26 to perform similar functionality in that controller's domain.

In some examples, service provider system 24 is implemented and operated by the service provider that manages service provider network 2. In such examples, customers of the service provider may interact with service provider system 24 using a client device (not shown). For instance, service provider system 24 may provide a portal that includes a graphical user interface and/or application programming interface (API), which allow customers to submit requests for network services. In some examples, service provider system 24 may be owned, operated, and/or maintained by the customer rather than the service provider that manages service provider network 2.

Service provider system 24 may send messages to interface 20 of controllers 10 to request network services. In some examples, interface 20 is implemented according to a stateless, client-server communications architecture. The stateless, client-server communications architecture may rely on a protocol that is cacheable. As an example, interface 20 may be implemented according to a representational state transfer (REST) software architecture to send and receive messages with service provider system 24.

To submit requests to controllers 10, service provider system 24 may generate messages that include service requests. A service request may include a definition of one or more services and/or resources of a network requested by a customer. As one example, a service request may specify a Virtual Private Network (VPN) service for a customer between one or more customer sites.

An example of a service request may include the following:
{
"service_name": "citi_l3vpn",
"service_type": "l3vpn",
"customer": "citi",
"sites": [
"SFO",
"LAX",
"NYC",
"DFW"
],
"topology": "full-mesh",
"qos_profile": "gold"
}

The attributes "service_name", "service_type", "customer", "sites", "topology" and "qos_profile" attributes together with the corresponding values collectively define a request to configure a full mesh VPN with a Gold quality of service profile between customer sites SFO, LAX, NYC, and DFW.

In response to input provided by a customer to request a service, service provider system 24 may generate a service request defining the service, such as described for the VPN service above. Service provider system 24 sends a message including the service request to interface 20. Service provisioning module 26 may realize the state of the network represented by the service request. That is, service provisioning module 26 may translate the high-level data model of the service abstraction defining the service into a lower level form suitable for interacting with network elements of service provider network 2. A controller 10 that receives the message may validate the request included in the message and provision the service if sufficient resources exist to satisfy the request. In this way, interface 20 and service provisioning module 26 may provide a flexible service abstraction layer for controllers 10 that can support fast-changing service types, adapt to real time network resources, and enforce business logic.

Service provider system 24 may be implemented as hardware, software, and/or a combination of hardware and software. Although shown as a standalone system in FIG. 1, any set of functionality of service provider system 24 described in this disclosure may be implemented in controllers 10, gateway 8, AAA server 11, policy control server 14, or any other suitable device.

Controllers 10 may provision services in multiple segments corresponding to various boundaries and/or layers of service provider network 2. For example, a virtual LAN (VLAN) or an L2/L3 circuit for a first service segment for a service used by any one or more of subscriber devices 16 may be carried through the access network 6 infrastructure and mapped to a virtual private network (VPN) routing and forwarding table (VRF table) or a virtual private LAN service (VPLS) instance at a PE router in a point of presence of core network 7. The second service segment may then be initiated at the ingress PE router that delineates a boundary between access network 6 and core network 7. Core network 7 carries the service across to the other end, the egress PE router, where this second service segment terminates and gets mapped into the access/aggregation infrastructure on the receiving end, perhaps as the last segment of the service and operating over edge network 9B. This is merely one illustrative example of service provisioning. Other examples of varying complexity are described further below. Indeed, various networks illustrated in FIG. 1, such as core network 7, may include multiple layers that may be separately provisioned as individual segments of a service in order to establish the service. In addition, each of the various segments may employ different types of networks, e.g., optical, routing, and wireless, to transport data.

Optical, routing, and wireless networks typically have different types of control planes, which are logical entities that receive service requests and allocate network resources to satisfy the service requests (in addition to other tasks). The various types of control plane models are described in further detail below. But in general, optical networks use centralized, static, pre-planned routing and wavelength assignment with predetermined protection paths. Routers use a dynamic, distributed control plane with instances embedded on each network element. Wireless networks use a variety of control plane strategies often involving a hybrid approach where distributed controllers act as central control points for some segments of the network.

Controllers 10 facilitate dynamic provisioning of routing and switching network elements using routing protocols such as Border Gateway Protocol (BGP) route reflectors and Path Computation Element Protocol (PCEP), management provisioning protocols (e.g., Netconf/YANG), and emerging software-defined networking (SDN) protocols (e.g., Open-Flow). Routing equipment is typically optimized to reconfigure very quickly as a result of network failures.

In the transport domain, the provisioning is typically more static with relatively simple protection paths. However, the techniques described herein may accommodate increasingly common dynamic provisioning methods outside of the routing and switching domain. For example, the provider may employ optical networks for core network 7 that are at least partially dynamically reconfigurable despite several important difficulties that make dynamic configuration much more computationally complex. Optical vendors have focused on recovering quickly from transient conditions caused by loss of certain channels due to fiber cut and are improving control loops to recover very quickly from this condition. But currently the reverse operation is not well supported, and adding several channels dynamically could potentially be much more difficult than recovering from the loss of channels. Specifically, although the speed of modern Reconfigurable Optical Add-Drop Multiplexer (ROADM) with microelectromechanical systems (MEMs) and Liquid Crystal on Silicon (LCoS) is acceptable for adding individual channels, in most implementations channels need to be added serially. Attempting to add multiple channels at once could cause equalization problems. Tuning speed for tunable lasers and also for local oscillators in coherent systems is variable based on the components themselves.

The emerging method of space-division multiplexing may create additional problems. Using multiple modes (e.g., in Multi-Mode Fiber (MMF)) or multiple cores in Multi Core Fiber, the same wavelength could be sent different cores over the same fiber. Next-Gen ROADMs could route both the wavelength and the mode. But this could induce impairment due to mode-mixing. This may be mitigated by using Orthogonal Frequency-Division Multiplexing (OFDM), but this may be impractical for some applications.

In the fixed and wireless access network 6 segments, the provider may employ dynamic provisioning despite complexity caused by the underlying mechanisms. In the cable operator (Multiple System Operator (MSO)) domain, the Data Over Cable Service Interface Specification (DOCSIS) 3.x standards specify a means of channel bonding and dynamic frequency allocation. In accordance with techniques described herein, controllers 10 may dynamically allocate or de-allocate bandwidth between a Cable Modem Termination System (CMTS) and a Cable Modem in response to load demand. The actual tune-up delay for this type of operation will be variable based on the specific vendor equipment and the cable plant itself. Likewise, in the wireless context Long-Term Evolution (LTE) R11 controllers 10 may allocate multiple bearers to a high-priority application. Again however, actual allocation time and setup time is variable based on the equipment and environmental conditions.

In all these cases, dynamic provisioning and reconfiguration has more complexity than in the typical Internet Protocol (IP) routing case. Controllers 10 employ rules and constraints for dynamic service provisioning to facilitate acceptable configurations, and the controllers 10 may sequence operations, which may include significant delays between operations taking effect.

In accordance with techniques described herein, the network of controllers 10 implement a multi-domain, multi-level control plane that creates paths on-demand across multitudinous and heterogeneous network segments and layers of service provider network 2. In this way, controllers 10 may dynamically and responsively deploy services to facilitate distributed applications and service access. For example, distributed applications executing in geographically disparate data centers, e.g., represented by edge networks 9A, 9B, may request many thousands of services by which the data centers may exchange data via Internet Data Center Interconnect (as one example) to provide Software-as-a-Service (SaaS). Controllers 10 may apply techniques described in this disclosure to deploy IP and optical bandwidth to meet the application demands. Similarly, controllers 10 may dynamically and responsively deploy services to facilitate sufficient bandwidth to areas of heavy consumption ("hot spots") or poor RF penetration ("not spots"). In some instances, controllers 10 utilize diverse and often environmentally sensitive forms of microwave as well as virtual Multiple-Input and Multiple-Output (MIMO) over distributed base stations.

The controllers 10 discover network resources of their respective domains by means of routing protocols such as Interior Gateway Protocols (IGPs), as well as management methods such as Netconf/YANG, e.g. In addition, the controllers 10 may discover the network state by gathering load status, statistics, counters, alarms, and health indications by using management methods such as Netconf/YANG, Simple Network Management Protocol (SNMP), Transport Layer Interface (TLI), and/or Common Object Request Broker Architecture (CORBA). Network state information may include congestion levels and impairment levels for adaptive routing. FIG. 1 illustrates controllers 10 receiving statistics ("STATS."), which may represent any of the network state discovered by controllers 10 as described above.

Controllers 10 configure service provider network 2 within their respective domains by issuing commands to at least one segment of the network 2 to establish paths. FIG. 1 illustrates controllers 10 realizing a network configuration by communicating "CONTROL" to the respective domains. For this purpose the controllers 10 may use signaling protocols such as MPLS RSVP-TE, Generalized MPLS, or configuration protocols such as Netconf, SNMP, PCEP, or other protocols for installing state or otherwise controller elements of service provider network 2.

Controllers 10 execute path computation algorithms to calculate paths and assign load to network resources. For optical network segments, this may include specifying wavelength assignment, optical regeneration, and wavelength conversion. Adaptive algorithms executed by controllers 10 may in some cases take into account load and congestion levels to attempt to route new lightpaths over routes that are less likely to block other lightpaths in the future. Such algorithms may be impairment-aware and exclude or de-prioritize paths that do not meet a certain level of stability. Impairment awareness can be applied to transmission impairment over any analog link, including optical, microwave, Wi-Fi, or radio frequency transmission. The source of the impairment may be environmental, as in the case of transport that is not conveyed over a waveguide.

Impairment may also indicate degeneration in the transmission plant itself. In either case, however, the recovery method is applicable.

Control planes of various network segments may communicate to form control networks in order to satisfy multi-segment service requests, i.e., those service requests that require a service that traverses multiple segments. In other words, the control networks are groups of control plane instances and/or of controllers 10 that cooperate to establish network paths in the network segments to satisfy service requests. A control plane or control network may be organized according any one of four models: centralized, fully-distributed, path-threaded, and pre-distributed. A control network may include control plane members organized according to different ones of the models and thus constitutes what is referred to herein as a hybrid control network.

A centralized control plane is the most conceptually simple control plane, being a single logical control plane instance. Optical Transport networks currently use a centralized control plane, which permits near-optimal routing because the centralized control plane is provided a complete view of the network (many routing problems are NP-Complete, though heuristics-based, near-optimal routing is sufficient). The centralized control plane facilitates constraint-based and impairment-aware routing but does not scale well in terms of processing service requests, for all service requests are single-threaded through a single logical entity.

A fully-distributed control plane is well-illustrated by a network of routers or other network elements. In the fully-distributed model, an embedded agent in every network element determines the next hop for each packet by exchanging data with other network elements.

A path-threaded control plane refers to a control model in which network elements establish a traffic-engineered path element-by-element, with each network element making a hop-by-hop decision, committing resources, and allowing downstream nodes to do the same. If the path is blocked at any point in this process, the signaling method reverses the process, winding back (or "cranking back") the path to the point where the network elements can direct the path away from the blockage. This model is advantageous for setting up paths quickly in networks that are not congested. However, the paths are frequently sub-optimal because each network element applies only local knowledge. As a result, thrashing may occur in a congested network, leading to delayed path setup.

A pre-distributed model provides any controller of controllers 10 complete control over setting up paths for a subset of network resources, or "segment." The controller 10 assigns paths within the controller's domain of control. Paths that exit the domain of controller 10 operating according to the pre-distributed model are negotiated with other controllers 10 or delegated to a controller 10 at a higher layer in the hierarchy, e.g., controllers 10G, 10H. (The pre-distributed model implies a hierarchy with a central controller 10I at the apex). This model is advantageous in circumstances in which many service requests are confined within distinct network segments. By contrast, a large number of multi-segment service requests may increase the required interactions between the controllers 10 and create operational complexity.

The network of the controllers 10 (or "control network") discovers the services request profile of service provider network 2 as well as the available the resources of the service provider network 2. The control network self-scales and distributes computation and the span of control among the controllers and logical control planes to process service demands with high-performance and near-optimal routing.

For example, the service provider may deploy controllers 10 at various logical locations within service provider network 2. The controllers 10 accept network service requests and allocate network resources. The network of controllers 10 distribute computation and span of control within a hierarchy (vertically) and peer-to-peer (horizontally). The controllers 10 may perform a meta-analysis of the service load and adapt the span of control, hierarchy, and distributed computation in a way that seeks to optimize performance and utilization of service provider network 2 in accordance with service provider policies. In some examples, the controllers 10 implement a state machine that embodies services provider policies, where service request volume is combined to become an event causing a state transition, and the controllers 10 adapt the span of control, hierarchy, and distributed computation according to new state determined by the state transition.

An example transition between control network models to improve the control network hierarchy may begin with a pre-distributed model for a subset of controllers 10. Each of the controllers 10 receive and record single-segment service requests, and each of the controllers 10 receive and record multi-segment service requests. In addition, the controllers report the multi-segment service requests to a higher-level controller 10 in the hierarchy. For example, controllers 10B, 10C may report multi-segment service requests to controller 10G, which may in turn report multi-segment service requests to central controller 10I. So long as the number of multi-segment service requests remains under a configurable threshold (in this example), controllers 10B and 10C may negotiate to establish paths to satisfy the multi-segment service requests. In the event that the number of multiple-service requests exceeds the threshold, segments in the domain of controllers 10B and 10C may transition to centralized control by controller 10G, for instance). Thus, the decision criteria to modify any control network model may be determined by the analysis of network resources and a service request profile for the network segments controlled by the control network. In addition to simple thresholding techniques, which may be applied manually as described in the above example, the controllers 10 may employ automated statistical analysis and/or machine learning/AI to determine the best-performing control model in view of the service request profile and available resources. Either manual or automated reconfiguration may be performed at a configurable interval/period. The controllers 10 reconfigure according to the determined model and enforce the model once configured. By analyzing the services request profile to intelligently and cooperatively adapt the control network to network conditions, the controllers 10 may in this way facilitate high-performance services request fulfillment and near-optimal routing of services traffic by service provider network 10.

Figure 2:
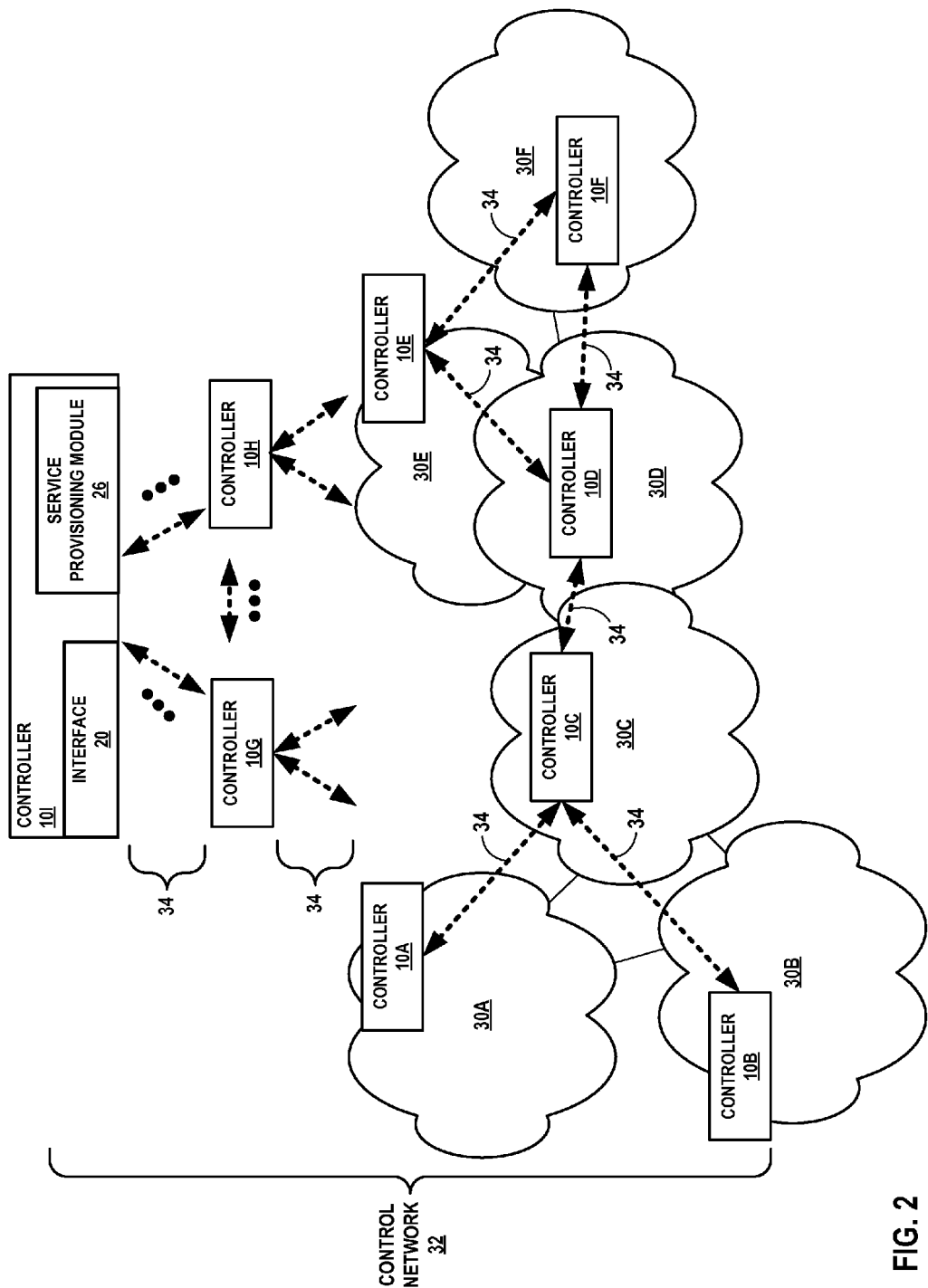
FIG. 2 is a block diagram illustrating network segments controlled by a control network of controllers according to techniques described in this disclosure.

FIG. 2 is a block diagram illustrating network segments controlled by a control network of controllers according to techniques described in this disclosure. Each of network segments 30A-30F (collectively, "network segments 30") represents a set of network resources of a provider network or enterprise network that allocates network resources to provision services for customers. For example, any of network segments 30 may represent at least a portion of an optical transport network (OTN), backhaul network, access network, RAN, core network, data center, core network, etc.

Network segments may each represent a subset of the network resources of service provider network 2 illustrated in FIG. 1, for instance.

Network segments 30 each have associated boundaries with one or more of the other network segments 30 and are each controlled by one or more of controllers 10A-10I operating collectively as a control network 32 according to a hierarchy. Although illustrated as "controller" devices, each of controllers 10A-10F for respective network segments 30A-30F may represent a control plane that is fully or partially distributed among elements of the network segment. In this respect, control network 32 may be considered a network of control planes or "control network." In addition, each of controllers 10 may represent multiple computing resources that cooperatively perform tasks of the controller to form the logical controller illustrated in FIG. 2. The hierarchy for the control network 32 is illustrated as three-tiered, but control network 32 may include any two or more tiers, in various examples.

According to techniques described herein, a network manager deploys controllers 10 to the network to control network segments 30 according to an initial domain configuration for controllers 10. The control network 32 discovers the services request profile for network segments 30 and the available resources of network segments 30. The controllers 10 may exchange control information, via peer communications 34, in a peer-to-peer fashion as control network 32, and based on the discovered services request profile and available resources, the control network 32 automatically self-scales to process service demands with high-performance and near-optimal routing.

More specifically, controllers 10 distribute computation and span of control in both a hierarchical (vertical) and peer-to-peer (horizontal) dimension. For example, controllers 10 may perform a meta-analysis of the services request profile and adapt the span of control, hierarchy, and distributed computation among controllers 10 in a manner that improves performance and network utilization according to service provider or enterprise policies. In some examples, controllers 10 adapt to the conditions by implementing a state machine whereby service request volume is combined to become an event causing a state transition, where the new state of control network 32 has a different span of control, hierarchy, control models, and/or computation distribution than the previous state. The state machine may be distributed among controllers 10 such that each controller may individually analyze its own domain and communicate with peer controllers 10 in its own tier of the hierarchy, as well as or alternatively with controllers 10 at higher/lower tiers of the hierarchy, to determine a transition of the distributed state machine.

Figure 3:
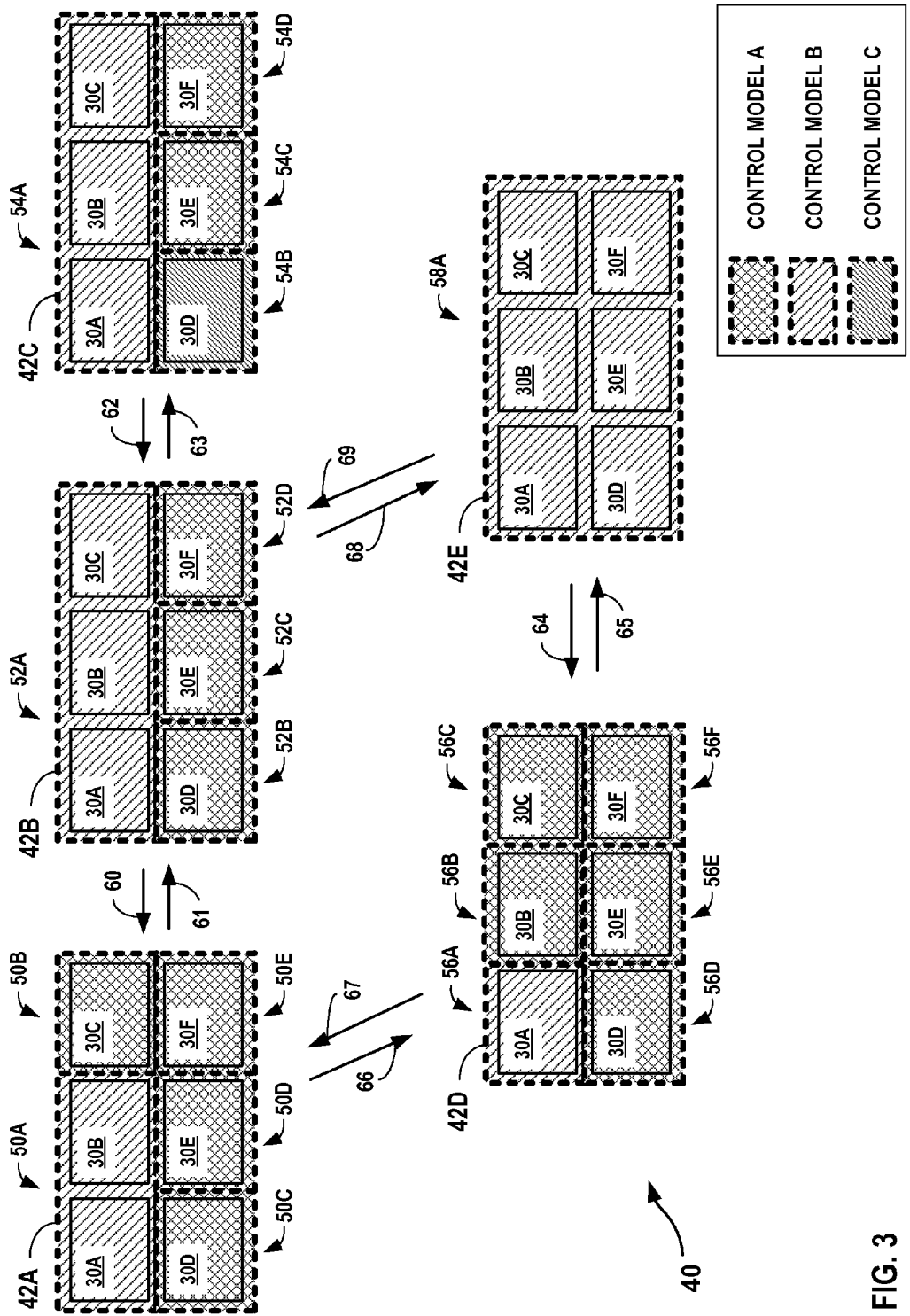
FIG. 3 is a block diagram conceptually illustrating a state machine that may be employed by a control network of controllers to adapt control models and span of control for network segments.

FIG. 3 is a block diagram conceptually illustrating a state machine that may be employed by a control network of controllers to adapt control models and span of control for network segments. Network segments 30 may represent network segments of FIG. 2. In this example, controllers 10 making up a control network 32 each encompass a respective one of domains 50, 52, 54, 56, and 58, depending on the control network state 42A-42E ("states 42") of the state machine 40. For example, control network state 42A specifies domains 50A-50E, where domain 50A encompasses network segments 30A, 30B; domain 50B encompasses network segment 30B; domain 50C encompasses segment 30D; domain 50D encompasses segment 30E; and domain 50E encompasses segment 30F. Each of the domains operates according to one of control models A, B, and C, each of which may represent any of the models described above (fully distributed, centralized, path-threaded, and pre-distributed). The control network 32 of controllers 10 thus includes various mixes of control plane operating according to the various models, again depending upon the control network state 42A-42E for the control network 32.

The control network 32 determines whether to modify the control network 32 configuration based the services request profile according to provider/enterprise preferences as expressed, e.g., by policies embodied in the state machine 40 by the states 42 and transitions 60-69. State transitions 60-69 are conditioned on characteristics of the services request profile for segments 30, such as number of multi-segment requests, number of single-segment requests, network resource utilization, and so forth. For example, high utilization for a segment 30 may militate toward more centralization of the control plane for the segment. And large number of multi-segment services requests may militate toward delegating the span of control for control planes of the segments to a higher-layer controller within the hierarchy of the control network 32. State transitions may be determined in a distributed or centralized manner by controllers 10.

For instance, beginning at state 42A, a controller 10G controls segments 30A-30B according to control model B. Upon controllers 10A, 10B, and 10C reporting a number of multi-segment requests, for services that traverse 10A-10B and/or 10B-10C, that exceeds a threshold that conditions transition 61, controllers 10 may adapt the control models and span of control for network segment 30C to reflect state 42B of state machine 40. Specifically, controller 10G may increase its span of control by subsuming controller 10C, which in state 42A operated segment 30C according to control model A, into the control model B controlled by controller 10G. When the number of multi-segment requests falls below the threshold (or some other condition is satisfied), controllers 10 may transition per transition 60 to return to state 42A. Alternatively, controllers 10 may transition from state 42B per transition 68 to state 42E, in which apex controller 10I may undertake full-spanned control of all network segments 30. The other examples of states 42 and transitions 60-69 illustrate additional adaptations by the control network 32 to the services request profile and resource availability of segments 30. By transitioning among states 42 of the state machine 40, controllers 10 may improve performance of the segments 30 for service delivery as well as improve network utilization to prevent additional CapEx outlays, all while balancing the various considerations of service provisioning (responsiveness, efficiency, path optimality, cost, etc.) according to provider/enterprise preferences as embodied in the state machine.

Figure 4:
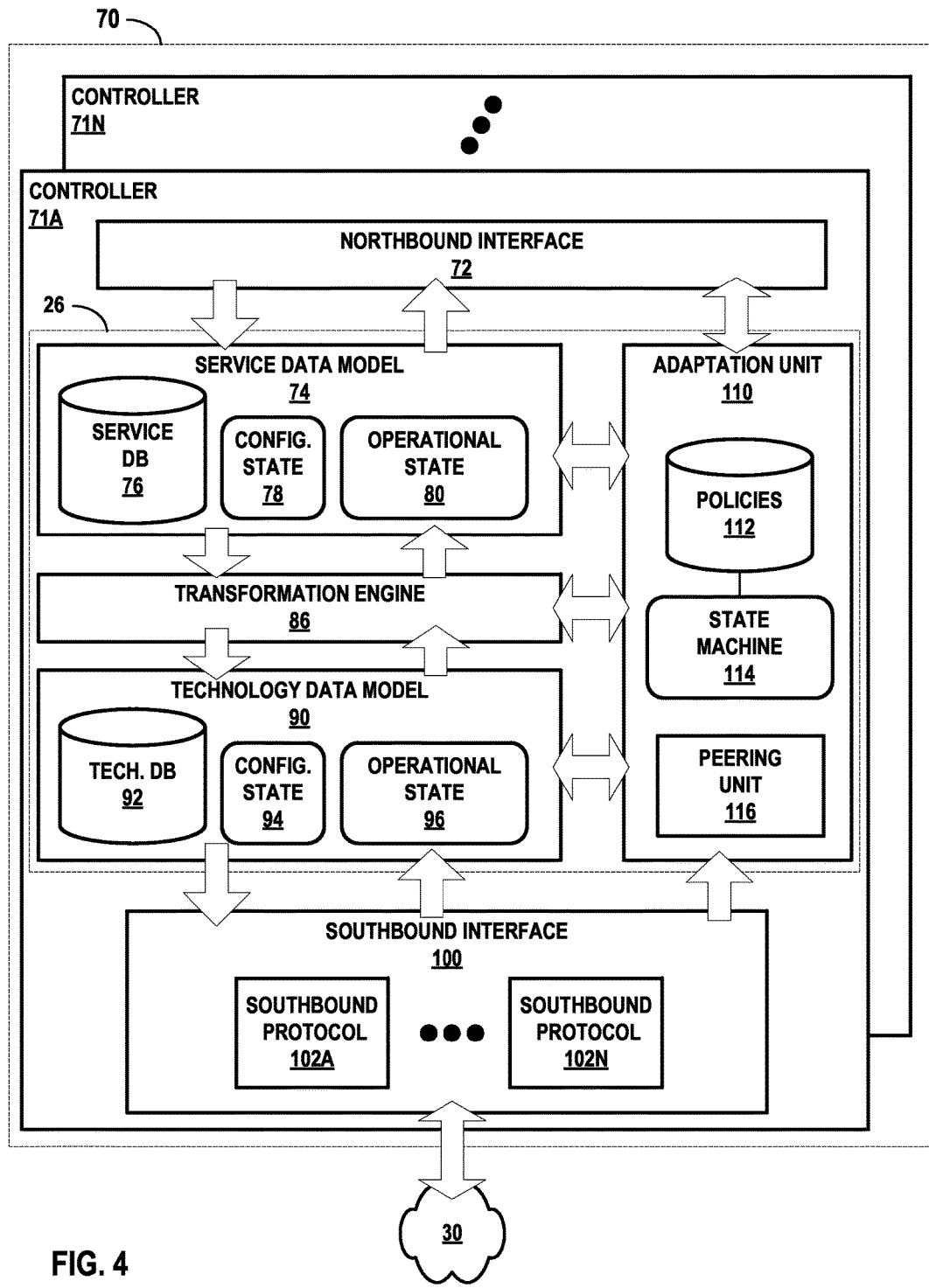
FIG. 4 is a block diagram illustrating an example instance of a controller operates according to techniques described in this disclosure.

FIG. 4 is a block diagram illustrating an example instance of a controller that operates according to techniques described in this disclosure. Controller 70 is a logically centralized but in some cases physically distributed controller for at least one segment 30 of a network. Controller 70 includes, in this example, a plurality of controllers 71A-71N (collectively, "controllers 71") that federate to apply functionality attributed to controller 70. Controllers 71 may adapt to network conditions by self-scaling to increase the number of controller 71 instances (i.e., scale horizontally). Controller 70 may represent an instance of any of controllers 10 of FIGS. 1-2.

Each of controllers 71 includes similar components to perform similar functionality, said components and functionality being described hereinafter with respect to controller 71A. Some components of controllers 71A, such as one or more programmable processors and network interfaces, are not shown for ease of illustration purposes. Controller 71A presents a northbound interface 72 that may be invoked by other controllers in a hierarchical arrangement of various instances of controller 70 or by an orchestrator, administrator, or other entity, to modify configuration state 78 ("config. state 78") or extract operational state 80 of the controller 71A and descriptive of the service data model 74. Northbound interface 72 may represent an example instance of interface 20 of FIGS. 1-2. As noted above, northbound interface 72 may be used for integration with an orchestration system such as OpenStack; northbound interface 72 may also or alternatively used by other applications or the operator's Operations Support Systems (OSS)/Business Support Systems (BSS). Northbound interface 72 may in some cases present a RESTful Application Programming Interface (API).

Service database 76 stores objects that represent instantiated services within a formal service data model 74. The high-level service model 74 may include, e.g., a demand calendar and constraints upon the network directed by the provider/enterprise. Transformation engine 86 transforms the service objects in service database 76 from the high-level service data model 74 to corresponding lower-level objects in the technology data model 90. Transformation engine 86 may include a schema transformer. In this sense, transformation engine 86 operates as a compiler of service data model 74 to technology data model 90. Whereas the high-level service data model 74 describes services previously requested and instantiated or being processed for eventual instantiation with the network segment under control of controller 70, the low-level technology data model 90 describes how those services are implemented or are to be implemented within the network, as represented in technology database 92. Technology database 92 may include, for example, an object that describes a TE-LSP that at least partially implements a service in service database 76. The technology data model 90 includes configuration state 94 that describes respective configurations of the network elements as well as operational state 96 that describes respective operational characteristics of the network elements, such as load, available bandwidth, etc.

Put another way, the high-level service data model 74 describes the desired state of the network under the control of controller 70 at a very high level of abstraction, using objects that map directly to services provided to end users— for example, a virtual network, a connectivity policy, or a security policy. The low-level technology data model 90, on the other hand, describes the desired state of the network at a very low level of abstraction, using objects that map to specific network protocol constructs such as a BGP route target or a VxLAN network identifier. Accordingly, southbound interface 100 executes one or more southbound protocols 102A-102K (collectively, "southbound protocols 102") with which controller 71A may obtain configuration state 94 and operational state 96 from and inject configuration state 94 and operational state 96 into the network segment 30 under the control of controller 70, where configuration state 94 and operational state store objects intelligible to southbound protocols 102 and mapped to constructs of southbound protocols 102. In this way, controller 71A may make the state of the network under control of controller 70 match the desired state of the network as received by controller 71A via northbound interface 72 and represented by service data model 74. Southbound protocols 102 may include protocols for path provisioning as well as for topology discovery. For example, southbound protocols 102 may include Path Computation Element (PCE) Communication Protocol (PCEP), Open Shortest Path First with Traffic Engineering extensions (OSPF-TE), Intermediate System to Intermediate System with Traffic Engineering extensions (ISIS-TE), BGP Link State (BGP-LS), NETCONF/Yang, Interface to the Routing System (I2RS) protocols, CLIs for the network elements, and SNMP.

According to techniques described in this disclosure, controller 71A further includes an adaptation unit 110 to determine and enforce a control model for the controller 71 and to distribute computation (e.g. path computation) and span of control within a control network hierarchy in which controller 70 is a member. Peering unit 116 provides one or more protocols by which adaptation unit 110 may exchange messages with other controllers 71 and with other controllers that are not logically part of controller 70. The messages may include network configuration and operational state information that conforms to the service data model 74 and/or conforms to the technology data model 90. The protocols may include message and/or control protocols such as BGP, Extensible Messaging and Presence Protocol (XMPP), ZeroMQ, and PCEP.

Policies 112 embody service provider/enterprise preferences for dynamically configuring and otherwise controlling the network to improve service provisioning performance. The policies 112 may specifies conditions that map to characteristics of the services request profile, such as number of multi-segment requests and number of single-segment requests, and/or available network resources as learned by southbound interface 100 or otherwise stored to service data model 74 and technology data model 90. In the example of FIG. 4, the policies are embodied by a state machine 114 having state transitions conditioned similarly to the policies 112.

State machine 40 of FIG. 3 may represent an example of state machine 114. Adaptation unit 110 applies a meta-analysis of the service data model 74 and technology data model 90 to determine whether policies 112 (whether or not embodied within state machine 114) specify a change to the control model for the control network in which controller 71A participates. For example, policies 112 may cause controller 71A to horizontally self-scale controller 70 (in some cases cooperatively with one or more of other controllers 71) to increase/decrease the number of controllers 71. As another example, policies 112 may cause controller 71A to re-distribute a path computation task to another controller. The other controller may occupy a higher level in the control network hierarchy, be another one of controllers 71, or may be a peer controller at the same level in the control network hierarchy as controller 70. Upon determining a change to the control model, the peering unit 116 may exchange messages with other controllers to send/receive computation tasks so as to re-distribute computation and to send/receive directives so as to adapt the span of control and control hierarchy, for example.

Figure 5:
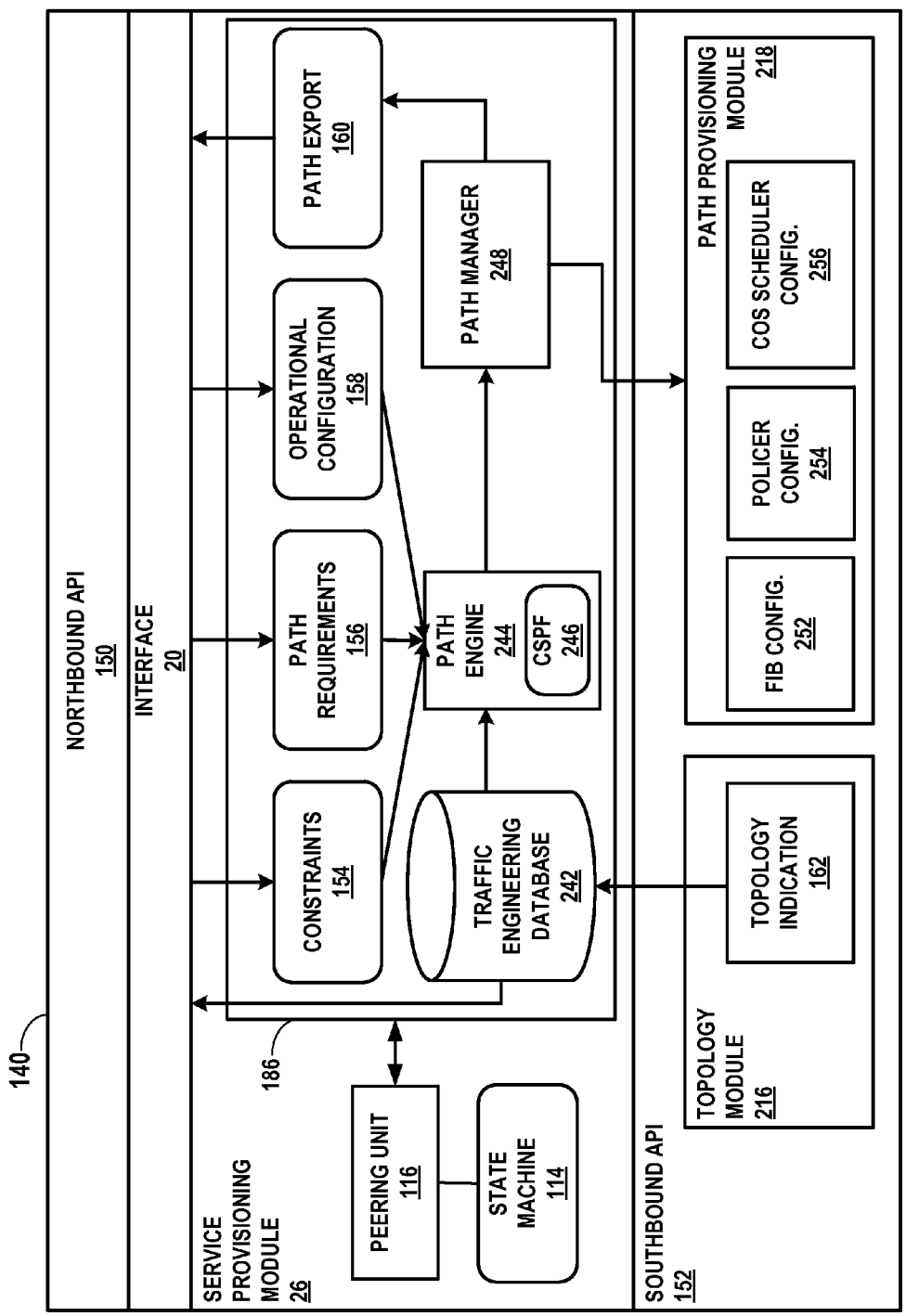
FIG. 5 is a block diagram illustrating an example instance of a controller that operates according to techniques described in this disclosure.

FIG. 5 is a block diagram illustrating, in detail another example controller such as one of controllers 10 of FIGS. 1-2 and of controllers 71 of FIG. 3, in accordance with techniques of the this disclosure. In this example, controller 140 includes northbound and southbound interfaces in the form of northbound application programming interface (API) 150 and southbound API (152), which may represent examples of northbound interface 72 and southbound interface 100, respectively. Northbound API 150 includes methods and/or accessible data structures by which network services applications may configure and request path computation and query established paths within the path computation domain for the controller. Southbound API 152 includes methods and/or accessible data structures by which service provisioning module 26 receives topology and network resource information for the path computation domain and establishes paths by accessing and programming data planes of aggregation nodes and/or access nodes within the path computation domain.

Path computation module 186 includes data structures to store path information for computing and establishing requested paths. These data structures include constraints 154, path requirements 156, operational configuration 158, and path export 160. Network services applications may invoke northbound API 150 to install and/or query data from these data structures. Constraints 154 represent a data structure that describes external constraints upon path computation. Constraints 154 allow network services applications to, e.g., modify link attributes before path computation module 186 computes a set of paths. For examples, Radio Frequency (RF) modules (not shown) may edit links to indicate that resources are shared between a group and resources must be allocated accordingly. Network services applications may modify attributes of link to effect resulting traffic engineering computations. In such instances, link attributes may override attributes received from topology indication module 216 and remain in effect for the duration of the node/attendant port in the topology. A link edit message to constraints 154 may include a link descriptor specifying a node identifier and port index, together with link attributes specifying a bandwidth, expected time to transmit, shared link group, and fate shared group, for instance.

Path export 160 represents an interface that stores path descriptors for all paths currently committed or established in the path computation domain. In response to queries received via northbound API 150, path export 160 returns one or more path descriptors. Queries received may request paths between any two network devices terminating the path(s). Path descriptors may be used by network services applications to set up forwarding configuration at the edge and access nodes terminating the path(s). A path descriptor may include an Explicit Route Object (ERO). A path descriptor or "path information" may be sent, responsive to a query from an interested party. A path export message delivers path information including path type (primary or detour); bandwidth for each CoS value; and, for each node in the ordered path from ingress to egress, a node identifier, ingress label, and egress label.

Path requirements 156 represent an interface that receives path requests for paths to be computed by path computation module 186 and provides these path requests (including path requirements) to path engine 244 for computation. A path requirement message may include a path descriptor having an ingress node identifier and egress node identifier for the nodes terminating the specified path, along with request parameters including CoS value and bandwidth. A path requirement message may add to or delete from existing path requirements for the specified path.

Topology module 216 includes topology indication module 162 to handle topology discovery and, where needed, to maintain control channels between service provisioning module 26 and nodes of the path computation domain (i.e. the domain controlled by controller 140). Topology indication module 162 may include an interface to describe received topologies to path computation module 186.

Topology indication module 162 may use a topology discovery protocol to describe the path computation domain topology to path computation module 186. Using topology discovery, topology indication module 162 may receive a list of node neighbors, with each neighbor including a node identifier, local port index, and remote port index, as well as a list of link attributes each specifying a port index, bandwidth, expected time to transmit, shared link group, and fate shared group, for instance. These are examples of constructs mapped to the low-level technology data model 90 of FIG. 4.

Topology indication module 162 may communicate with a topology server, such as a routing protocol (e.g. BGP) route reflector, to receive topology information for a network layer of the network. Topology indication module 162 may include a routing protocol process that executes a routing protocol to receive routing protocol advertisements, such as Open Shortest Path First (OSPF) or Intermediate System-to-Intermediate System (IS-IS) link state advertisements (LSAs) or Border Gateway Protocol (BGP) UPDATE messages. Topology indication module 162 may in some instances be a passive listener that neither forwards nor originates routing protocol advertisements. In some instances, topology indication module 162 may alternatively, or additionally, execute a topology discovery mechanism such as an interface for an Application-Layer Traffic Optimization (ALTO) service. Topology indication module 162 may therefore receive a digest of topology information collected by a topology server, e.g., an ALTO server, rather than executing a routing protocol to receive routing protocol advertisements directly.

In some examples, topology indication module 162 receives topology information that includes traffic engineering (TE) information. Topology indication module 162 may, for example, execute Intermediate System-to-Intermediate System with TE extensions (IS-IS-TE) or Open Shortest Path First with TE extensions (OSPF-TE) to receive TE information for advertised links. Such TE information includes one or more of the link state, administrative attributes, and metrics such as bandwidth available for use at various LSP priority levels of links connecting routers of the path computation domain. In some instances, topology indication module 162 executes BGP-TE to receive advertised TE information for inter-autonomous system and other out-of-network links.

Traffic engineering database (TED) 242 stores topology information, received by topology indication module 162, for a network that constitutes a path computation domain for controller 140 to a computer-readable storage medium (not shown). TED 242 may include one or more link-state databases (LSDBs), where link and node data is received in routing protocol advertisements, received from a topology server, and/or discovered by link-layer entities such as an overlay controller and then provided to topology indication module 162. In some instances, an operator may configure traffic engineering or other topology information within TED 242 via a client interface.

Path engine 244 accepts the current topology snapshot of the path computation domain in the form of TED 242 and computes, using TED 242, CoS-aware traffic-engineered paths between nodes as indicated by configured node-specific policy (constraints 154) and/or through dynamic networking with external modules via APIs. Path engine 244 may further compute detours for all primary paths on a per-CoS basis according to configured failover and capacity requirements (as specified in operational configuration 158 and path requirements 156, respectively).

In general, to compute a requested path, path engine 244 determines based on TED 242 and all specified constraints whether there exists a path in the layer that satisfies the TE specifications for the requested path for the duration of the requested time. Path engine 244 may use the Djikstra constrained SPF (CSPF) 246 path computation algorithms for identifying satisfactory paths though the path computation domain. If a satisfactory computed path for the requested path exists, path engine 244 provides a path descriptor for the computed path to path manager 248 to establish the path using path provisioning module 218. A path computed by path engine 244 may be referred to as a "computed" path, until such time as path provisioning module 248 programs the scheduled path into the network, whereupon the scheduled path becomes an "active" or "committed" path. A scheduled or active path is a temporarily dedicated bandwidth channel for the scheduled time in which the path is, or is to become, operational to transport flows.

Path manager 248 establishes computed scheduled paths using path provisioning module 218, which in this instance includes forwarding information base (FIB) configuration module 252 (illustrated as "FIB CONFIG. 252"), policer configuration module 254 (illustrated as "POLICER CONFIG. 254"), and CoS scheduler configuration module 256 (illustrated as "COS SCHEDULER CONFIG. 256").

FIB configuration module 252 programs forwarding information to data planes of aggregation nodes or access nodes of the path computation domain. The FIB of an aggregation node or access node includes the MPLS switching table, the detour path for each primary LSP, the CoS scheduler per-interface and policers at LSP ingress. FIB configuration module 252 may implement, for instance, a software-defined networking (SDN) protocol such as the OpenFlow protocol to provide and direct the nodes to install forwarding information to their respective data planes. Accordingly, the "FIB" may refer to forwarding tables in the form of, for instance, one or more OpenFlow flow tables each comprising one or more flow table entries that specify handling of matching packets. FIB configuration module 252 may in addition, or alternatively, implement other interface types, such as a Simple Network Management Protocol (SNMP) interface, path computation element protocol (PCEP) interface, a Device Management Interface (DMI), a CLI, Interface to the Routing System (I2RS), or any other node configuration interface. FIB configuration module interface 252 establishes communication sessions with aggregation nodes or access nodes to install forwarding information to receive path setup event information, such as confirmation that received forwarding information has been successfully installed or that received forwarding information cannot be installed (indicating FIB configuration failure). Additional details regarding PCEP may be found in "Path Computation Element (PCE) Communication Protocol (PCEP)," Network Working Group, Request for Comment 5440, March 2009, the entire contents being incorporated by reference herein. Additional details regarding I2RS are found in "Interface to the Routing System Framework," Network Working Group, Internet-draft, Jul. 30, 2012, which is incorporated by reference as if fully set forth herein.

FIB configuration module 252 may add, change (i.e., implicit add), or delete forwarding table entries in accordance with information received from path computation module 186. A FIB configuration message from path computation module 186 to FIB configuration module 252 may specify an event type (add or delete); a node identifier; a path identifier; one or more forwarding table entries each including an ingress port index, ingress label, egress port index, and egress label; and a detour path specifying a path identifier and CoS mode.

Policer configuration module 254 may be invoked by path computation module 186 to request a policer be installed on a particular aggregation node or access node for a particular LSP ingress. As noted above, the FIBs for aggregation nodes or access nodes include policers at LSP ingress. Policer configuration module 254 may receive policer configuration requests according to CCP. A CCP policer configuration request message may specify an event type (add, change, or delete); a node identifier; an LSP identifier; and, for each class of service, a list of policer information including CoS value, maximum bandwidth, burst, and drop/remark. FIB configuration module 252 configures the policers in accordance with the policer configuration requests.

CoS scheduler configuration module 256 may be invoked by path computation module 186 to request configuration of CoS on the aggregation nodes or access nodes. CoS scheduler configuration module 256 may receive the CoS scheduler configuration information. A scheduling configuration request message may specify an event type (change); a node identifier, a port identity value (port index); and configuration information specifying bandwidth, queue depth, and scheduling discipline, for instance.

In accordance with techniques of the disclosure, a customer may wish to configure a service in a service provider network. The customer may interact with service provider system 24 to provide one or more parameters that define the service requested by the customer. Service provider system 24 invokes interface 20 of northbound API 150 to provide controller 140 with a definition of the service requested by the customer, including attribute:value pairs that correspond to parameters provided by the user to request the service.

Depending on the control model for controller 140, path computation module 186 may provision the network service as requested. Upon receiving the data to provision the network service, path engine 244 obtains a current topology snapshot of the path computation domain in the form of TED 242 and computes, using TED 242, CoS-aware traffic-engineered paths.

If a satisfactory computed path for the requested path exists, path engine 244 provides a path descriptor for the computed path to path manager 248 to establish the path using path provisioning module 218. FIB configuration module 252 programs forwarding information to data planes of aggregation nodes or access nodes of the path computation domain. In some examples, policer configuration module 254 may be invoked by path computation module 186 to request a policer be installed on a particular aggregation node or access node for a particular LSP ingress. In some examples, CoS scheduler configuration module 256 may be invoked by path computation module 186 to request configuration of CoS scheduler on the aggregation nodes or access nodes.

Path provisioning module 218 may generate and/or compile resource models that are provided in a modeling language to set the parameters of network devices. In some examples, path provisioning module 218 may generate and/or compile resource models using the YANG data modeling language, published as RFC 6020. YANG may be used to model the state of network elements and configuration data. In the example of FIG. 5, path provisioning module 218 may compile any resource models needed to provision the network service into one or more modeling files according to the YANG standard. Upon compiling the one or more modeling files, path provisioning module 218 may execute service provisioning jobs to determine the contents of the one or more data modeling files and provision the requested service. Path provisioning module 218 may translate the YANG-standard formatted message to device-specific configuration information. Path provisioning module 218 then configures one or more network devices, which correspond to the device-specific configuration information. In this way, service provisioning module 26 changes the state of the computed path to provision the service.

Service provisioning module 26 operates according to a control model for the control network that includes controller 140 and that is determined by state machine 114, in the example of FIG. 5. State machine 40 of FIG. 3 may represent an example of state machine 114. Service provisioning module 26 analyzes received network state, as stored to TED 242 and operational configuration 158, to determine whether state machine 114 indicates, based on the network state, a change to the control model for the control network in which controller 140 participates. Example indications have been described above. Upon the service provisioning module 26 determining a change to the control model, the peering unit 116 may exchange messages with other controllers to send/receive computation tasks so as to re-distribute computation and to send/receive directives so as to adapt the span of control and control hierarchy, for example.

Figure 6:
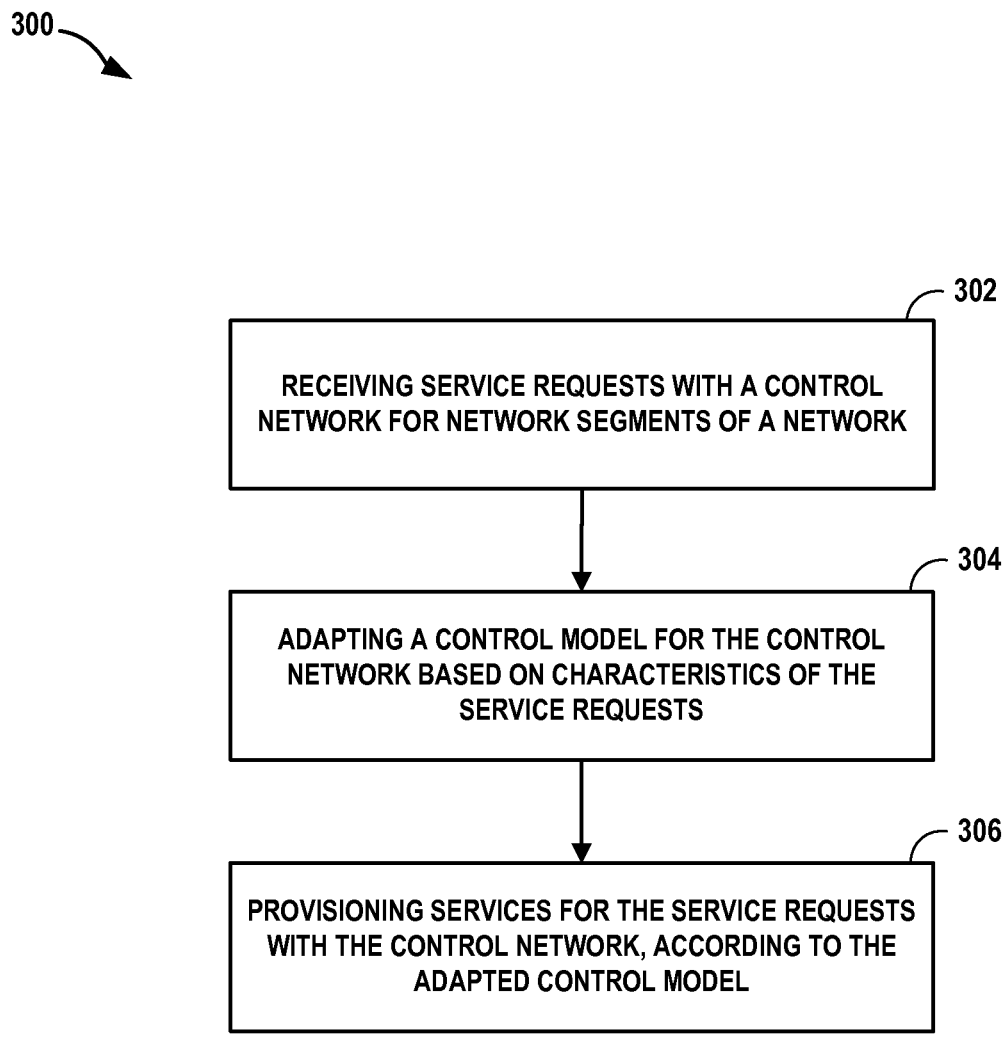
FIG. 6 is a flowchart illustrating an example mode of operation for controllers of a control network, according to techniques described herein.

FIG. 6 is a flowchart illustrating an example mode of operation for controllers of a control network, according to techniques described herein. The operation is described with respect to FIG. 2. Controllers 10 of control network 32 receive service requests that each requests the controllers 10 to establish a service over a path connecting at least two endpoints over one or more network segments (302). Based on characteristics of the service requests, such as a number of multi-segment requests, a number of single-segment requests, and so forth, the controllers 10 dynamically adapt the control model for the control network (304). In some cases the controllers 10 further account for network conditions such as available resources, for the dynamic adaptation. The controllers 10 provision services for the service requests according to the adapted control model (306).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
   receiving, by a plurality of controllers that constitute a control network for one or more network segments of a network, service requests that each comprises a definition for a service provided by the network to connect at least two endpoints over a path traversing at least one of the one or more network segments,
   wherein the control network operates according to a control model in which the plurality of controllers are arranged in a hierarchy, distribute path computation among the controllers in a distribution, and have respective spans of network control within the hierarchy for provisioning, by the plurality of controllers, services in the one or more network segments to satisfy the service requests, wherein a control model for a first segment of the one or more segments is a centralized control model;
   determining, by the plurality of controllers from the service requests and prior to provisioning services for the service requests in the network, a number of multi-segment service requests for segments that include the first segment is below a threshold;
   dynamically adapting, by the plurality of controllers and based on network conditions including the service requests, the control model for the control network to modify at least one of the hierarchy, the distribution, and the respective spans of network control within the hierarchy,
   wherein dynamically adapting the control model for the control network comprises modifying, in response to the determining, the control model for the first segment to conform to a control model selected from a path-threaded control model and a fully-distributed control model; and
   provisioning, by the plurality of controllers operating according to the adapted control model, the services for the service requests.

2. The method of claim 1,
   wherein the control model for the control network comprises a first control model selected from a centralized control model, fully-distributed control model, path-threaded control model, pre-distributed control model, and hybrid control model, and
   wherein dynamically adapting the control model for the control network comprises modifying the control model to conform to a second control model selected from the centralized control model, fully-distributed control model, path-threaded control model, pre-distributed control model, and hybrid control model,
wherein the first control model is different than the second control model.

3. The method of claim 1, wherein the control model for the first segment of the one or more segments is selected from a path-threaded control model and a fully-distributed control model, the method further comprising:
receiving, by the plurality of controllers, additional service requests;
determining, by the plurality of controllers from the additional service requests and prior to provisioning services for the additional requests in the network, the number of multi-segment service requests for segments that include the first segment meets the threshold;
modifying, by the plurality of controllers in response to determining the number of multi-segment service requests for segments that include the first segment meets the threshold, the control model for the first segment to conform to a centralized control model.

4. The method of claim 1,
wherein the control model for the control network determines a type of control plane for at least one of the network segments of the network, the type of control plane comprising a first control plane type of a centralized, fully-distributed, and path-threaded control plane type, and
wherein dynamically adapting the control model for the control network comprises modifying the control model to conform to a second control plane type of the centralized, fully-distributed, and path-threaded control plane type.

5. The method of claim 1,
wherein the hierarchy includes a plurality of levels each comprising one or more of the plurality of controllers, and
wherein dynamically adapting the control model for the control network comprises adapting a span of control for a higher-level controller from the plurality of controllers to include a domain comprising two of the one or more network segments.

6. The method of claim 1, wherein the service requests form a service request profile for the network, the method further comprising:
determining, based on policies for the control network that specify preferences of an operator of the network and are conditioned on the service request profile, a best-performing control model according to the policies,
wherein dynamically adapting the control model for the control network comprises modifying, in response to the determining, the control model to conform to the best-performing control model.

7. The method of claim 1, wherein the hierarchy includes a plurality of levels each comprising one or more of the plurality of controllers, the method further comprising:
receiving, by a first controller from the plurality of controllers, a first service request from the service requests; and
distributing, by the first controller to a higher-level controller from the plurality of controllers and based on the adapted control model, a path computation task for the first service request to determine a path traversing two of the plurality of network segments.

8. The method of claim 7, further comprising:
receiving, by the first controller from the higher-level controller, a path descriptor for the path for the path computation task; and
configuring, by the first controller, a network segment of the plurality of network segments to install the path to provision the service for the first service request.

9. The method of claim 1, wherein the hierarchy includes a plurality of levels each comprising one or more of the plurality of controllers, the method further comprising:
receiving, by a first controller from the plurality of controllers, a first service request from the service requests; and
reporting, by the first controller to a higher-level controller from the plurality of controllers upon determining the first service request comprises a multi-segment service request, the first service request.

10. The method of claim 9, further comprising:
determining, by the higher-level controller, a number of additional multi-segment service requests exceeds the threshold;
modifying, in response to determining the number of additional multi-segment service requests exceeds the threshold, the control model to distribute path computation tasks for the multi-segment service requests to the higher-level controller.

11. The method of claim 1,
wherein the service requests form a service request profile for the network, and
wherein dynamically adapting the control model for the control network comprises:
determining, by the plurality of controllers, a state machine transition is satisfied by the service request profile, the state machine transition proceeding from a first state specifying the control model to a second state specifying the adapted control model.

12. The method of claim 1, further comprising:
enforcing, by the plurality of controllers, the adapted control model to each of the plurality of segments.

13. The method of claim 1, wherein dynamically adapting the control model for the control network comprises periodically determining whether to adapt the control model for the control network.

14. The method of claim 1, wherein provisioning services for the service requests comprises:
translating the service requests to a low-level data model including configuration state that maps objects to constructs of a southbound protocol; and
installing, by the plurality of controllers using the southbound protocol, the configuration state to the network segments.

15. The method of claim 1, wherein dynamically adapting the control model for the control network comprises;
performing a statistical analysis of the network conditions; and
dynamically adapting, by the plurality of controllers according to a result of the statistical analysis, the control model for the control network.

16. A control network for one or more network segments of a network, the control network comprising:
a plurality of controllers each including one or more processors,
wherein the plurality of controllers receive service requests that each comprises a definition for a service provided by the network to connect at least two endpoints over a path traversing at least one of the one or more network segments, wherein the control network operates according to a control model in which the plurality of controllers are arranged in a hierarchy, distribute path computation among the controllers in a distribution, and have respective spans of network control within the hierarchy for provisioning, by the plurality of controllers, services in the one or more network segments to satisfy the service requests, wherein a control model for a first segment of the one or more segments is a centralized control model, wherein the plurality of controllers determine, from the service requests and prior to provisioning services for the service requests in the network, a number of multi-segment service requests for segments that include the first segment is below a threshold, wherein the plurality of controllers dynamically adapt, based on network conditions including the service requests, the control model for the control network to modify at least one of the hierarchy, the distribution, and the respective spans of network control within the hierarchy, wherein to dynamically adapt the control model for the control network the plurality of controllers modify, in response to the determination, the control model for the first segment to conform to a control model selected from a path-threaded control model and a fully-distributed control model, and wherein the plurality of controllers provision, according to the adapted control model, the services for the service requests.

17. The control network of claim 16, wherein the control model for the control network comprises a first control model selected from a centralized control model, fully-distributed control model, path-threaded control model, pre-distributed control model, and hybrid control model, wherein to dynamically adapt the control model for the control network the plurality of controllers modify the control model to conform to a second control model selected from the centralized control model, fully-distributed control model, path-threaded control model, pre-distributed control model, and hybrid control model, and wherein the first control model is different than the second control model.

18. The control network of claim 16, wherein the service requests form a service request profile for the network, and wherein to dynamically adapt the control model for the control network the plurality of controllers determine a state machine transition is satisfied by the service request profile, the state machine transition proceeding from a first state specifying the control model to a second state specifying the adapted control model.

19. A non-transitory computer-readable medium comprising instructions for causing one or more programmable processors to:

receive, by a plurality of controllers that constitute a control network for one or more network segments of a network, service requests that each comprises a definition for a service provided by the network to connect at least two endpoints over a path traversing at least one of the one or more network segments, wherein the control network operates according to a control model in which the plurality of controllers are arranged in a hierarchy, distribute path computation among the controllers in a distribution, and have respective spans of network control within the hierarchy for provisioning, by the plurality of controllers, services in the one or more network segments to satisfy the service requests, wherein a control model for a first segment of the one or more segments is a centralized control model;

determine, by the plurality of controllers from the service requests and prior to provisioning services for the service requests in the network, a number of multi-segment service requests for segments that include the first segment is below a threshold;

dynamically adapt, by the plurality of controllers and based on network conditions including the service requests, the control model for the control network to modify at least one of the hierarchy, the distribution, and the respective spans of network control within the hierarchy, wherein dynamically adapting the control model for the control network comprises modifying, in response to the determining, the control model for the first segment to conform to a control model selected from a path-threaded control model and a fully-distributed control model; and provision, by the plurality of controllers operating according to the adapted control model, the services for the service requests.

* * * * *